(12) United States Patent
Kwatra et al.

(10) Patent No.: US 7,272,017 B2
(45) Date of Patent: Sep. 18, 2007

(54) METHOD AND APPARATUS FOR COUPLING A PLURALITY OF CARDS TO AN INFORMATION HANDLING SYSTEM

(75) Inventors: Ajay Kwatra, Austin, TX (US); Charles D. Hood, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 34 days.

(21) Appl. No.: 11/134,920

(22) Filed: May 23, 2005

(65) Prior Publication Data

US 2006/0264085 A1    Nov. 23, 2006

(51) Int. Cl.
H05K 7/02 (2006.01)
H05K 7/04 (2006.01)
(52) U.S. Cl. ............... 361/807; 361/748; 361/736
(58) Field of Classification Search ......... 361/760, 361/720, 736, 748, 737, 727, 686, 687, 801, 361/759, 747, 726; 439/59–62
See application file for complete search history.

(56) References Cited

U.S. PATENT DOCUMENTS

| 4,198,024 | A | * | 4/1980 | Cavanna ............... 248/544 |
| 5,276,817 | A | * | 1/1994 | Matschke et al. ......... 439/61 |
| 5,333,293 | A | * | 7/1994 | Bonella ................ 711/167 |
| 5,383,793 | A | * | 1/1995 | Hsu et al. .............. 439/327 |
| 5,754,796 | A | * | 5/1998 | Wang et al. |
| 6,477,603 | B1 | | 11/2002 | Locker et al. |

* cited by examiner

*Primary Examiner*—Dean A. Reichard
*Assistant Examiner*—Hung S. Bui
(74) *Attorney, Agent, or Firm*—Haynes and Boone, LLP

(57) ABSTRACT

A card coupling apparatus includes a circuit board, a plurality of card connectors mounted on the circuit board, a system connector mounted to the circuit board, and a switch chip mounted to the circuit board and electrically coupled to the plurality of card connectors and the system connector. The card coupling apparatus may be coupled to an information handling system and a plurality of video cards may be coupled to the information handling system by coupling the plurality of video cards to the card coupling apparatus.

13 Claims, 10 Drawing Sheets

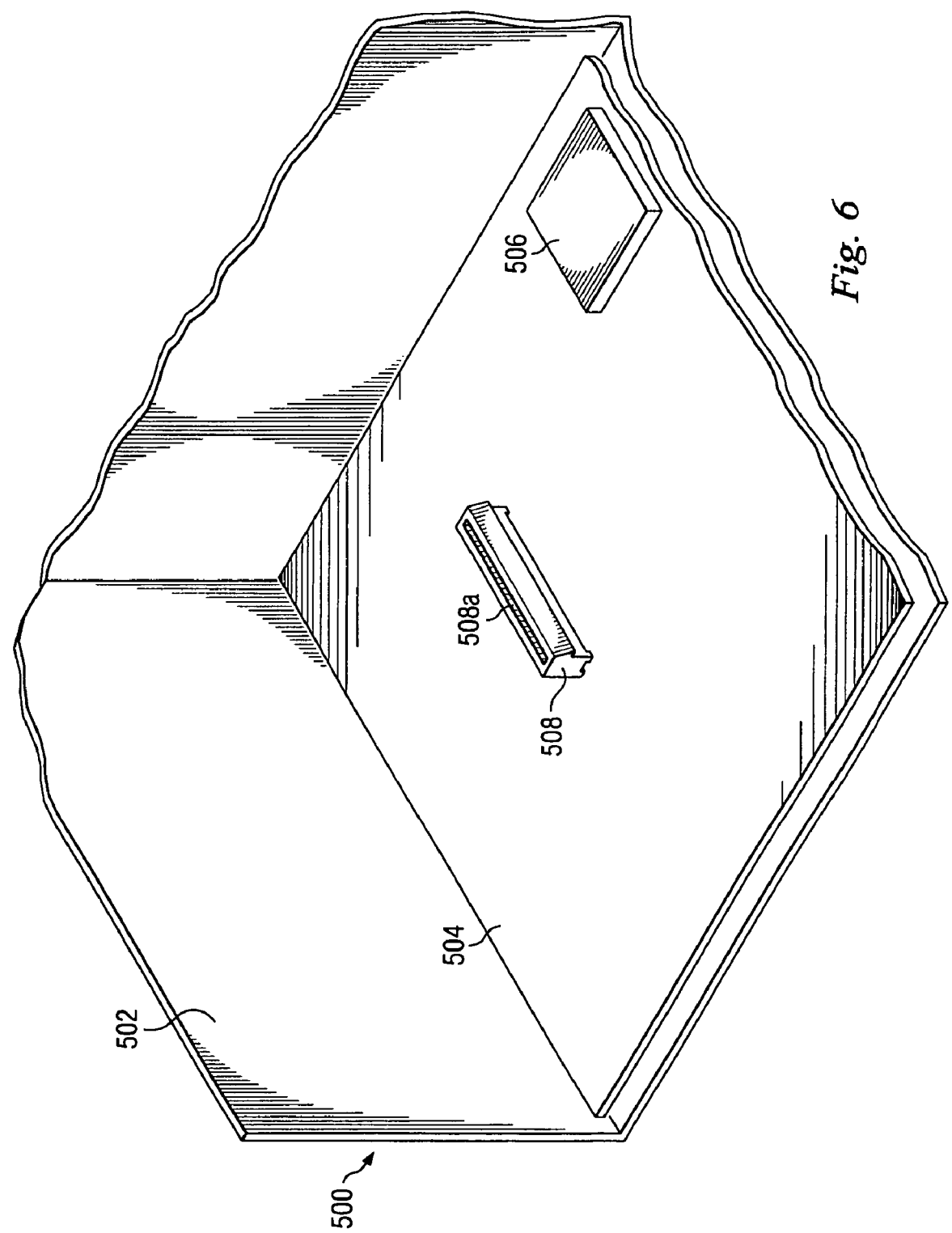

US 7,272,017 B2

METHOD AND APPARATUS FOR COUPLING A PLURALITY OF CARDS TO AN INFORMATION HANDLING SYSTEM

BACKGROUND

The present disclosure relates generally to information handling systems, and more particularly to coupling a plurality of cards to an information handling system.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include a video controller which generally includes at least one video card coupled to the information handling system. Video card manufacturers have begun to develop methods of scaling video performance by enabling multiple video cards to work in parallel in order to split the computational work of rendering the display. These methods of using multiple video cards raise issues with respect to the coupling of the video cards to the information handling system.

For example, many of the video cards manufactured couple to the information handling system through a PCI-Express connector. There are currently no Intel chipsets on the market which enable the wiring of multiple video card connectors in a manner which complies with PCI-Express specifications. Furthermore, adding an additional graphics bus to the Intel memory controller hub would substantially increase the pincount and the number of layers necessary on the board, substantially increasing the cost of the system.

Present solutions to this problem include wiring a second video card connector to the ×8 PCI-Express bus, which violates the PCI-Express specfications because the second video card connector only has eight of the sixteen lanes connected.

Accordingly, it would be desirable to provide for coupling a plurality of cards to an information handling system absent the disadvantages found in the prior methods discussed above.

SUMMARY

According to one embodiment, a card coupling apparatus is provided which includes a circuit board, a plurality of card connectors mounted on the circuit board, a system connector mounted to the circuit board, and a switch chip mounted to the circuit board and electrically coupled to the plurality of card connectors and the system connector.

A principal advantage of this embodiment is that the card coupling apparatus may be coupled to an information handling system and a plurality of video cards may be coupled to the card coupling apparatus in order or couple the plurality of video cards to the information handling system.

BRIEF DESCRIPTION OF THE DRAWINGS

FIG. 2b is a bottom perspective view illustrating an embodiment of the card coupling component of FIG. 2a.

FIG. 3 is a perspective view illustrating an embodiment of a secondary securing device used with the card coupling component of FIG. 2a.

FIG. 4 is a perspective view illustrating an embodiment of a flex cable use with the card coupling component of FIG. 2a.

FIG. 6 is a perspective view illustrating an embodiment of an information handling system used With the card coupling component of FIG. 2a, the secondary securing device of FIG. 3, the flex cable of FIG. 4, and the video card of FIG. 5.

FIG. 7b is a perspective view illustrating an embodiment of the flex cable of FIG. 4 coupled to the card coupling component of FIG. 2a during the method of FIG. 7a.

FIG. 7c is a perspective view illustrating an embodiment of a plurality of the secondary securing devices of FIG. 3 coupled to the card coupling component of FIG. 2a during the method of FIG. 7a.

FIG. 7d is a perspective view illustrating an embodiment of a card coupling apparatus being coupled to the information handling system of FIG. 6 during the method of FIG. 7a.

FIG. 7e is a perspective view illustrating an embodiment of a card coupling apparatus coupled to the information handling system of FIG. 6 during the method of FIG. 7a.

FIG. 7f is a perspective view illustrating an embodiment of a plurality of the video cards of FIG. 5 coupled to the card coupling apparatus and in the information handling system of FIG. 7e during the method of FIG. 7a.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
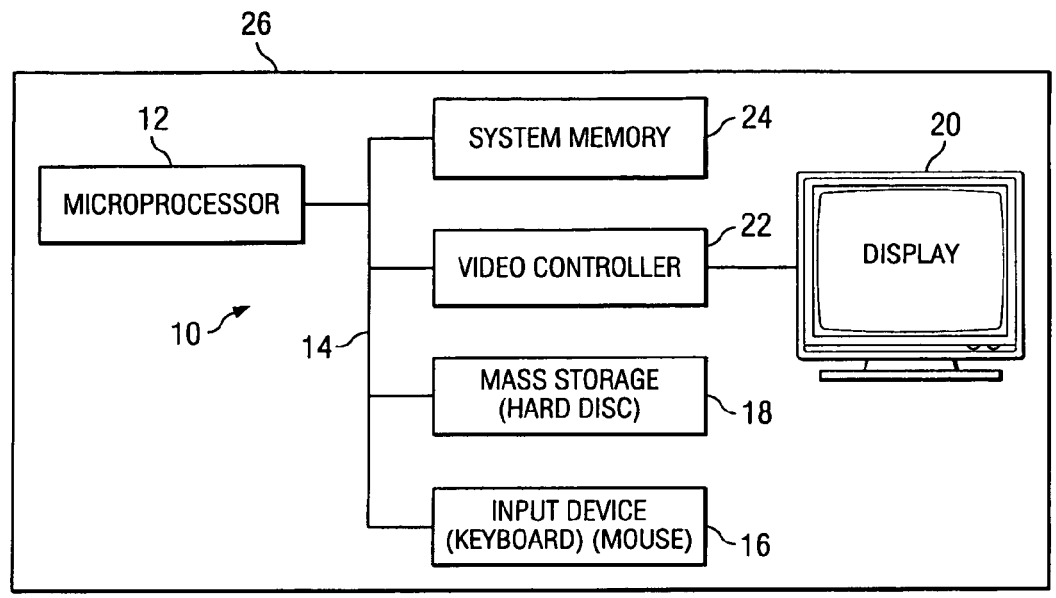
FIG. 1 is a schematic view illustrating an embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. In an embodiment, a chassis 26 may house some or all of the component of the information handling system 10. It should be understood that other busses and intermediate circuits can be deployed between the components described above and microprocessor 12 to facilitate interconnection between the components and the microprocessor.

Figure 2A:
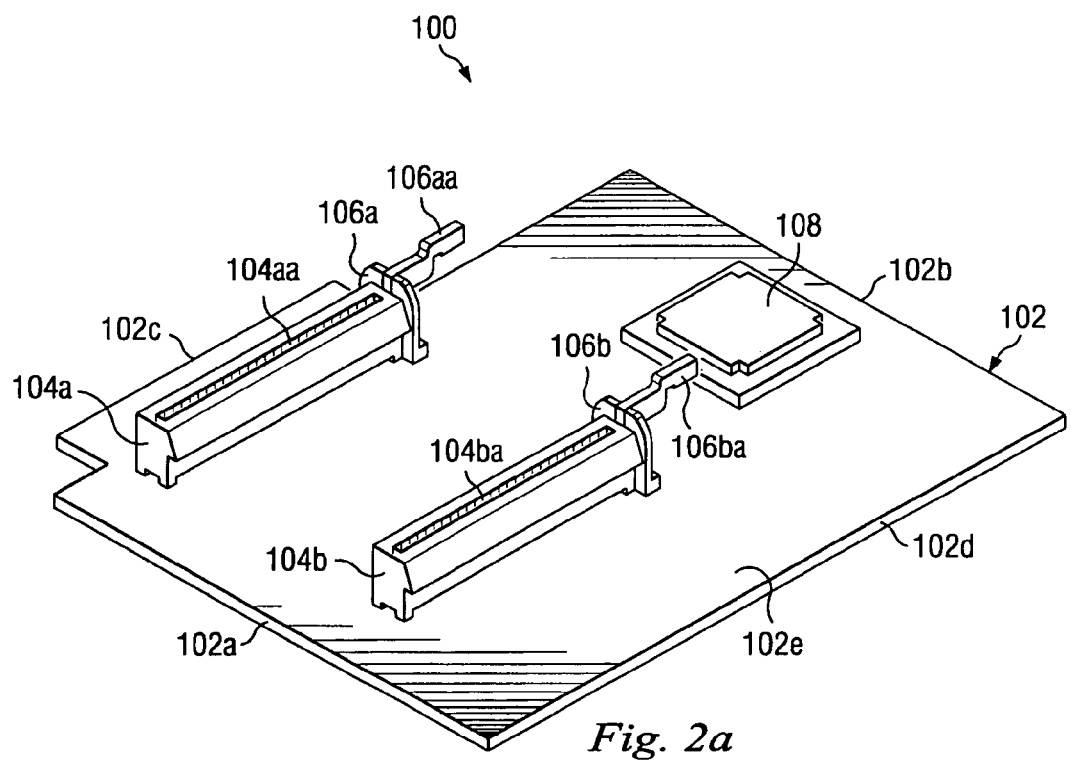
FIG. 2a is a top perspective view illustrating an embodiment of a card coupling component.
Figure 2B:
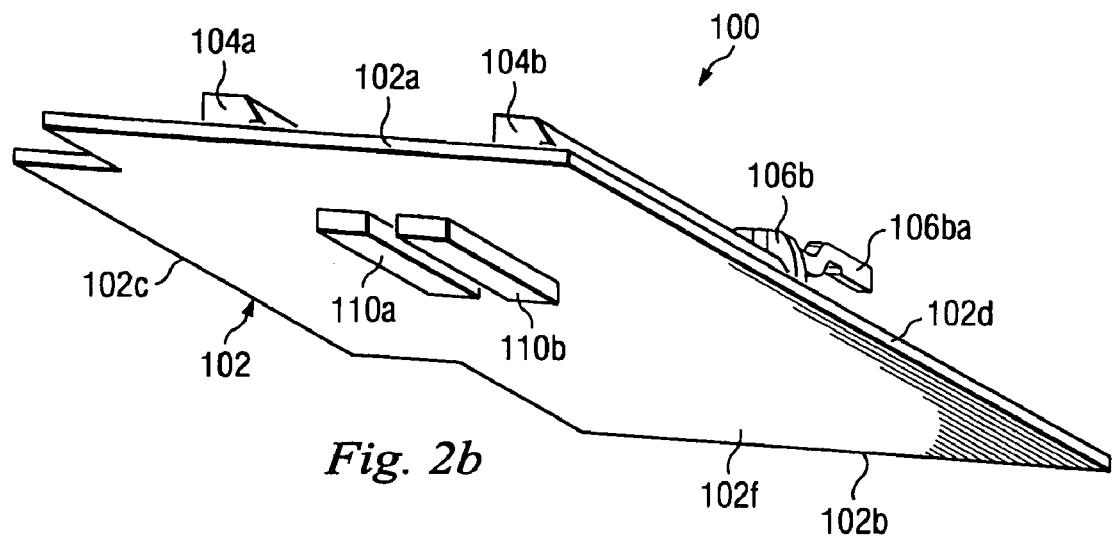

Referring now to FIGS. 2a and 2b, a card coupling component 100 is illustrated. Card coupling component 100 includes a circuit board 102 having a front end 102a, a rear end 102b located opposite the front end 102a, a plurality of opposing sides 102c and 102d extending between the front end 102a and the rear end 102b, a top surface 102e, and a bottom surface 102f located opposite the top surface 102e. A plurality of video card connectors 104a and 104b are mounted to the top surface 102e of the circuit board 102 and positioned in a substantially parallel and spaced apart relationship on the circuit board 102 adjacent the sides 102c and 102d, respectively, and adjacent to the front end 102a. Video card connector 104a defines a card slot 104aa which is centrally located on the video card connector 104a along its length. Video card connector 104b defines a card slot 104ba which is centrally located on the video card connector 104b along its length. A plurality of primary card securing devices 106a and 106b are mounted to the circuit board 102 and positioned adjacent each of the video card connectors 104a and 104b, respectively. Each primary securing device 106a and 106b includes a securing member 106aa and 106ba, respectively, which is pivotally coupled to the primary securing device 106 and 106b. A switch chip 108 is mounted to the circuit board 102 and positioned adjacent the video card connectors 104a and 104b and the rear end 102b of circuit board 102. The switch chip 108 is electrically coupled to the plurality of video card connectors 104a and 104b through the circuit board 102. A plurality of flex cable connectors 110a and 110b are mounted to the bottom surface 102f of the circuit board 102. The flex cable connectors 110a and 110b are electrically coupled to the switch chip 108 through the circuit board 102. In an embodiment, the plurality of connectors 104a and 104b are PCI-Express connectors. In an embodiment, the switch chip 108 is a PCI-Express switch chip which provides a plurality of PCI-Express ports which are each connected to the video card connectors 104a and 104b. In an embodiment, the flex cable connectors 110a and 110b are zero insertion force (ZIF) connectors.

Figure 3:
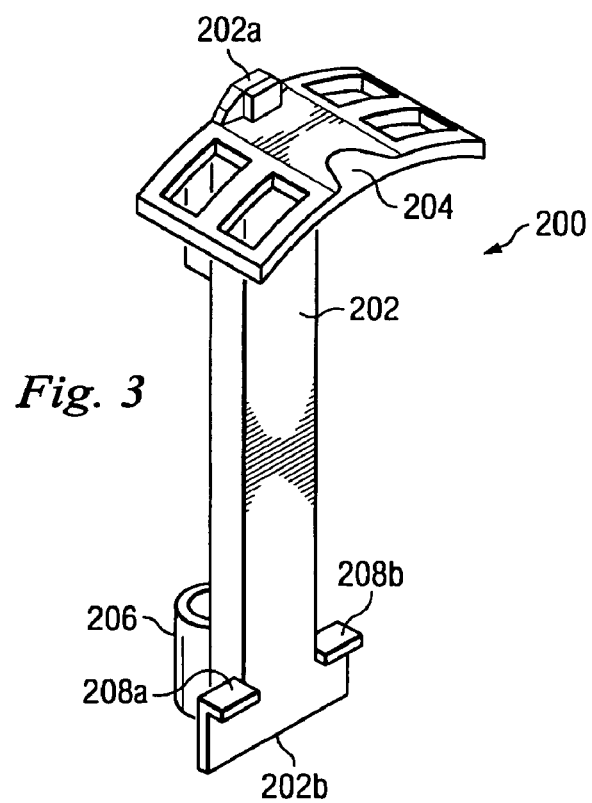

Referring now to FIG. 3, a secondary card securing device 200 is illustrated. Secondary card securing device 200 includes an elongated member 202 having a top end 202a and a bottom end 202b which is located opposite the top end 202a. The secondary card securing device 200 includes a securing member 204 which is mounted to the elongated member 202 and positioned adjacent the top end 202a of the elongated member 202. A board mounting member 206 is located on the elongated member 202 and adjacent the bottom end 202b of the elongated member 202. A plurality of supports 208a and 208b extend from the elongated member 202 and are positioned and opposite sides of the elongated member 202 and adjacent the bottom end 202b of elongated member 202.

Figure 4:
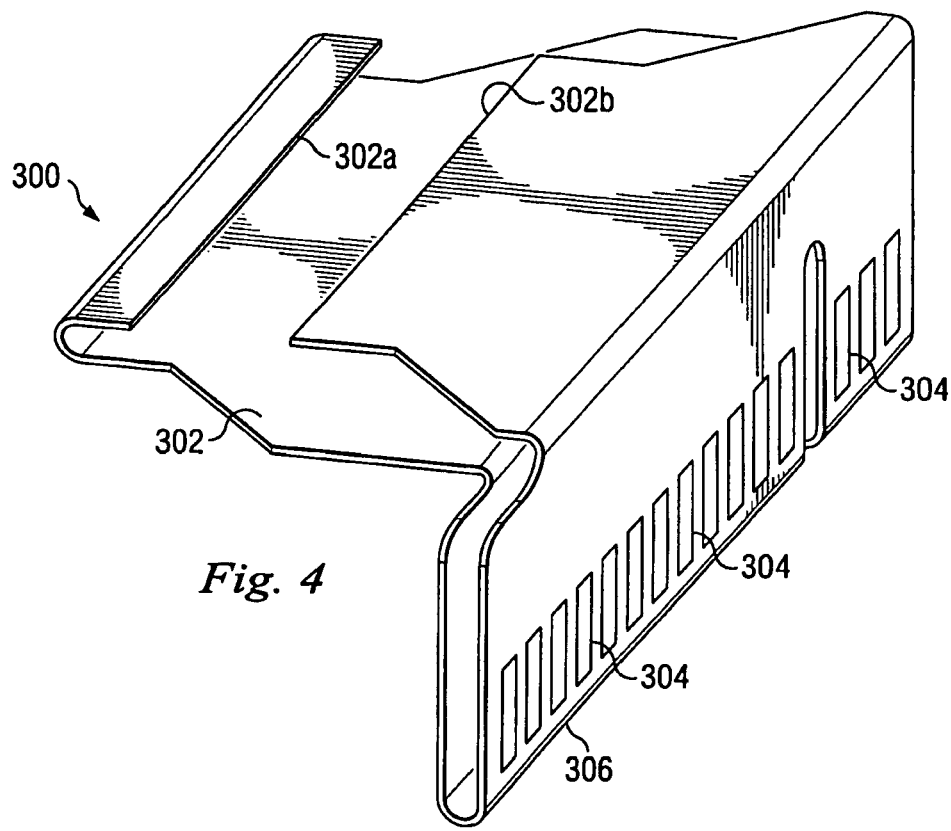

Referring now to FIG. 4, a flex cable 300 is illustrated. Flex cable 300 includes a base 302 having a first end 302a and a second end 302b which is located facing the first end 302a due to the base 302 having been bent in a manner which allows such positioning. A plurality of connector contacts 304 are located on a connector end 306 of the base 302 and are electrically coupled to the first end 302a and the second end 302b of the base 302. In an embodiment, the connector end 306 is operable to mate with a PCI-Express connector.

Figure 5:
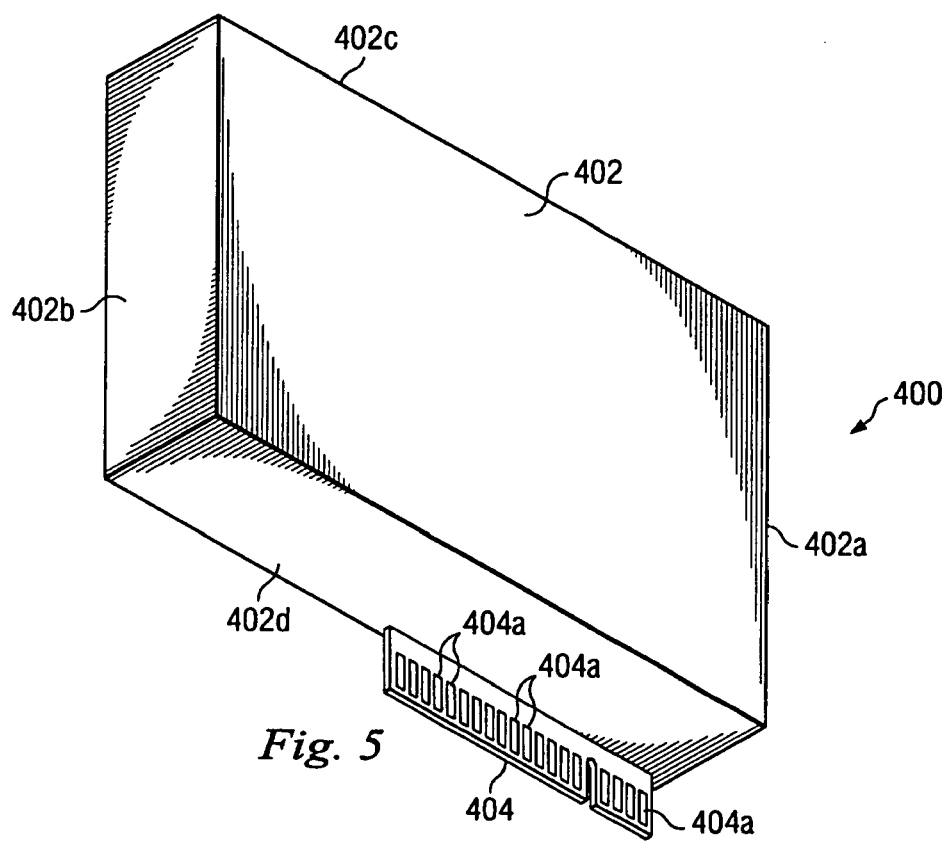
FIG. 5 is a perspective view illustrating an embodiment of a video card used with the card coupling component of FIG. 2a and the secondary securing device of FIG. 3.

Referring now to FIG. 5, a video card 400 is illustrated. Video card 400 includes a base 402 having a front surface 402a, a rear surface 402b located opposite the front surface 402a, a top surface 402c extending between the front surface 402a and the rear surface 402b, and a bottom surface 402d located opposite the top surface 402c. A connection member 404 extends from the bottom surface 402d of the base 402 and includes a plurality of connector contacts 404a along the length of the connection member 404. In an embodiment, the connection member 404 is operable to mate with a PCI-Express connector.

Referring now to FIG. 6, an information handling system 500 which may be, for example, the information handling system 10 illustrated in FIG. 1, is illustrated. Information handling system 500 includes a chassis 502 which may be, for example, the chassis 26 illustrated in FIG. 1, and which houses some or all of the components of the information handling system 500 such as, for example, the components of information handling system 10 illustrated in FIG. 1. A motherboard 504 is mounted in the chassis 502 and includes a microprocessor 506 which may be, for example, the microprocessor 12 illustrated in FIG. 1, mounted on its surface. A video card connector 508 is mounted to the motherboard 502 and is electrically coupled to the microprocessor 506 through the motherboard 502. The video card connector 508 defines a card slot 508a along its length. In an embodiment, the video card connector 508 is a PCI-Express connector.

Figure 7A:
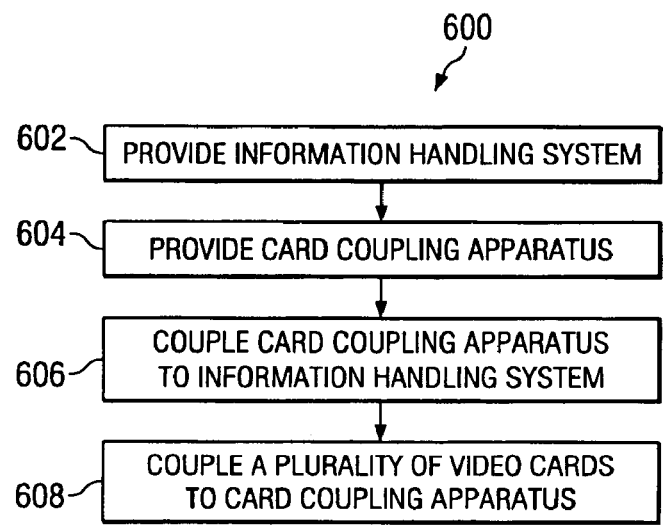
FIG. 7a is a flow chart illustrating an embodiment of a method for coupling a plurality of cards to an information handling system.
Figure 7B:
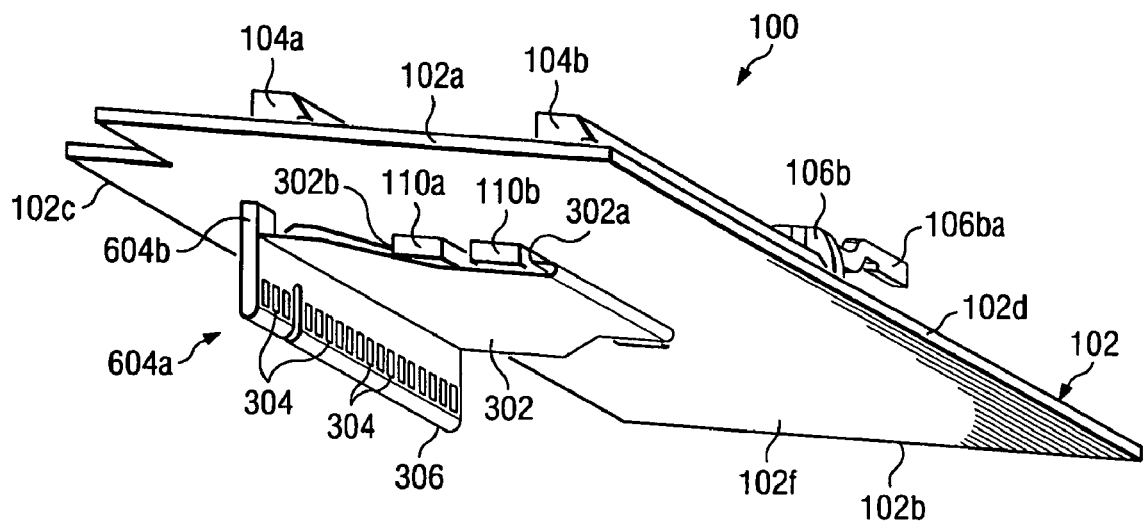
Figure 7C:
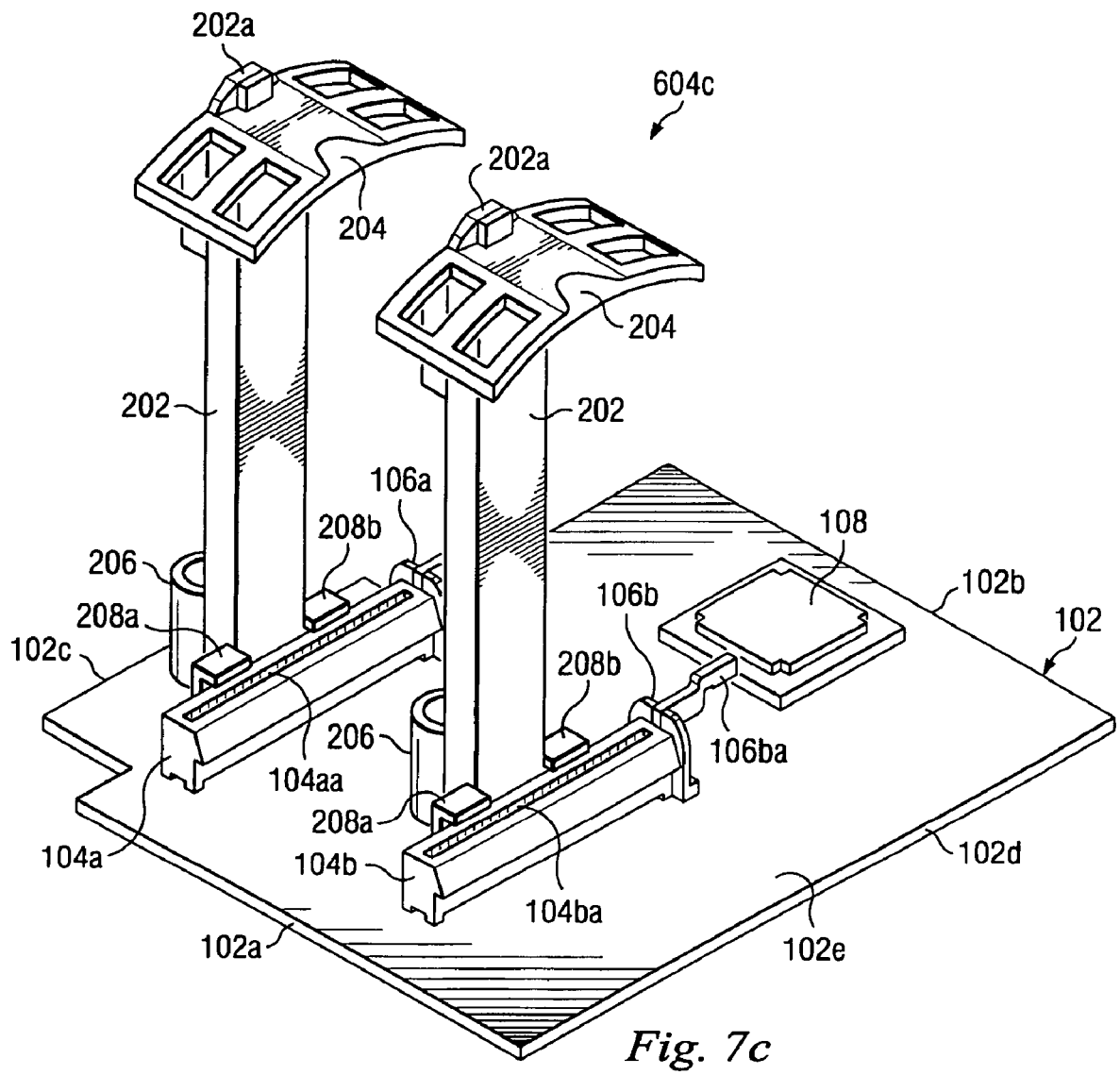

Referring now to FIGS. 6, 7a, 7b, and 7c, a method 600 for coupling a plurality of cards to an information handling system is illustrated. The method begins at step 602 where the information handling system 500 is provided. The information handling system 500 may include some or all of the components of the information handling system 10, illustrated in FIG. 1. The method 600 then proceeds to step 604 where a card coupling apparatus is provided. The flex cable 300 is coupled to the card coupling component 100 by coupling the first end 302a of the flex cable 300 to the flex cable connector 110a and coupling the second end 302b of the flex cable 300 to the flex cable connector 110b, providing a system connector 604a, as illustrated in FIG. 7b. The flex cable 300 is coupled to the card coupling component 100 such that the video card connector 104a is located directly above the connector end 306 of the flex cable 300. A support board 604b may be mounted to the circuit board 102 and engaging the connector end 306 of the flex cable 300 along its length in order to provide support to the flex cable 300. A secondary card securing device 200 is then mounted to the circuit board 102 between the side 102c of the circuit board 102 and the video card connector 104a such that supports 208a and 208b on the secondary card securing device 200 engage the video card connector 104a and the securing member 204 is positioned above the video card connector 104a. Another secondary card securing device 200 is then mounted to the circuit board 102 between the video card connector 104a and the video card connector 104b such that supports 208a and 208b on the secondary card securing device 200 engage the video card connector 104b and the securing member 204 is positioned above the video card connector 104b. With the flex cable 300 and secondary securing devices 200 coupled to the card coupling component 100, a card coupling apparatus 604c is provided.

Figure 7D:
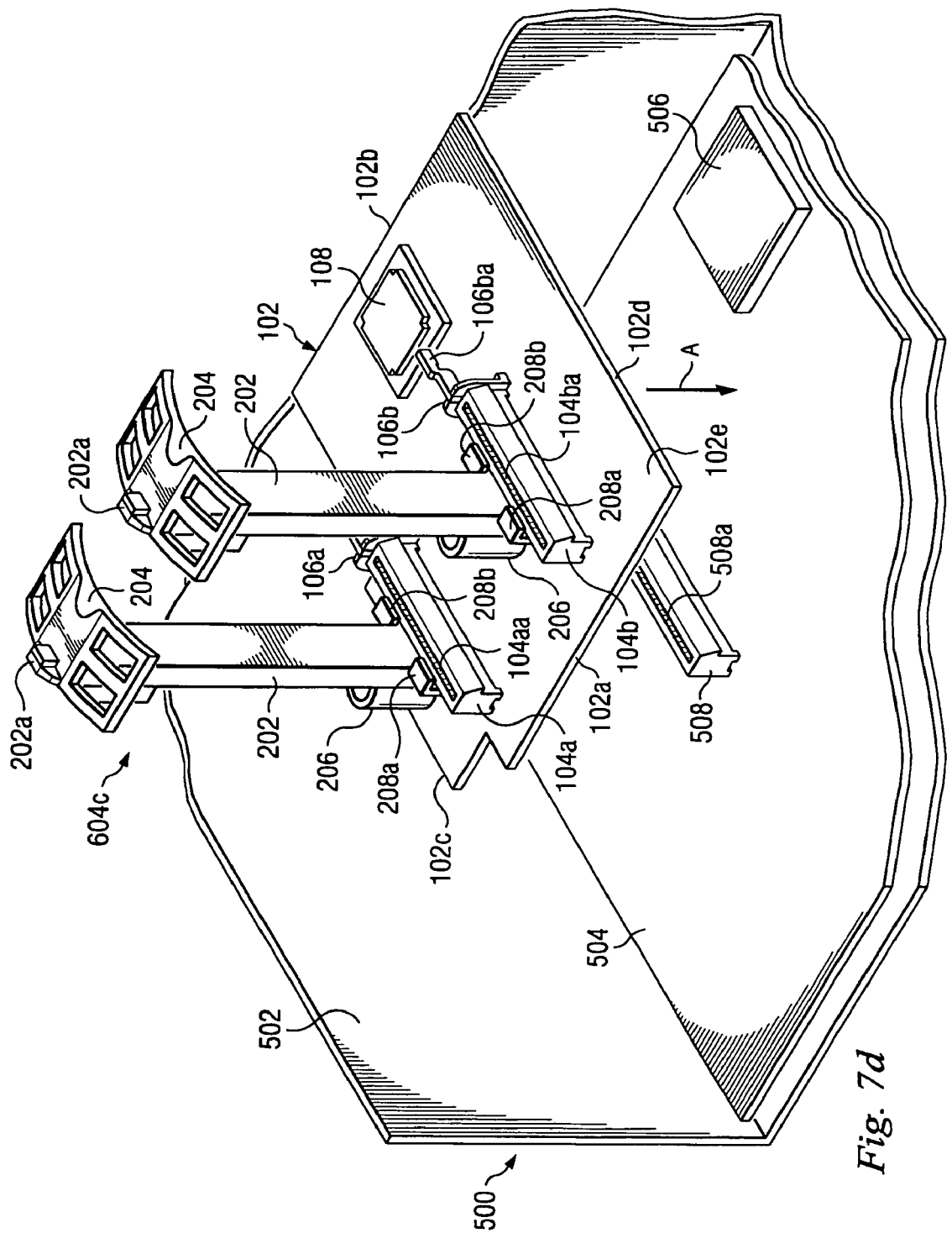
Figure 7E:
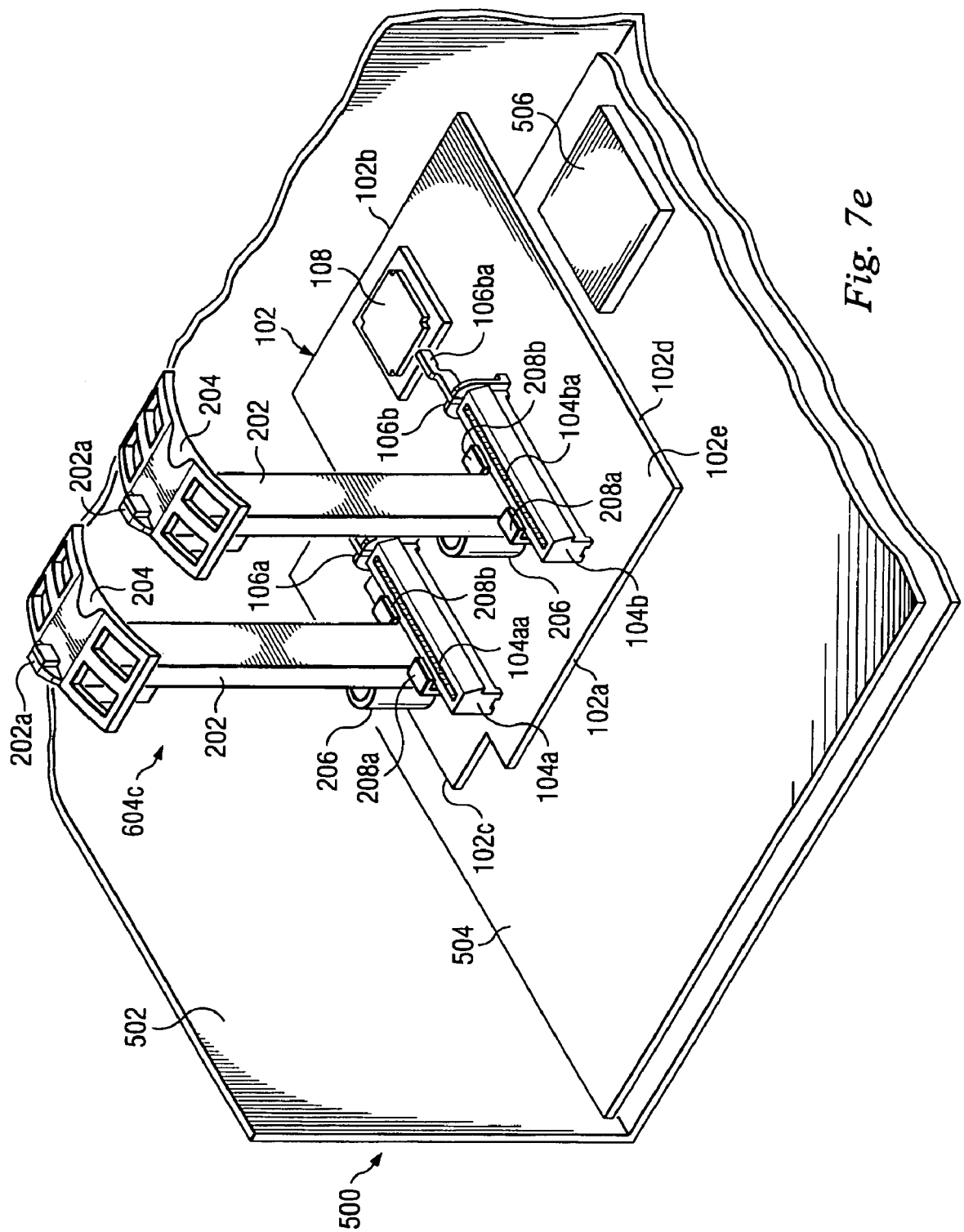
Figure 7F:
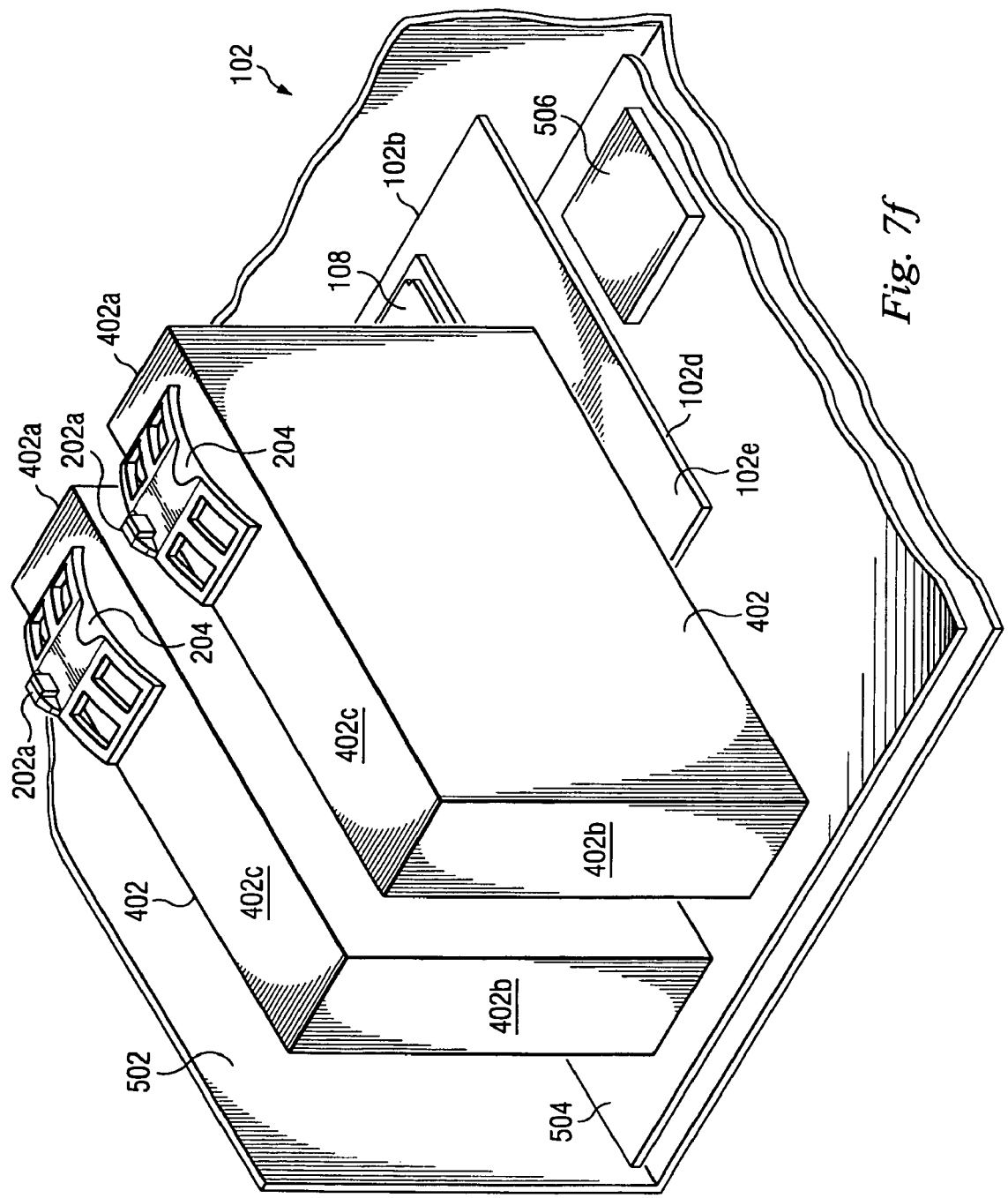

Referring now to FIGS. 6, 7a, 7b, 7d, and 7e, the method 600 proceeds to step 606 where the card coupling apparatus 604c is coupled to the information handling system 500. The card coupling apparatus 604c is positioned in the chassis 502 and over the motherboard 504 of the information handling system 500 such that the system connector 604a is substantially in line with the video card connector 508 mounted to the motherboard 504, as illustrated in FIG. 7d. The card coupling apparatus 604c is then moved in a direction A such that the connector end 306 on flex cable 300 of the system connector 604a matingly engages the card slot 508a on video card connector 508 and couples the card coupling apparatus 604c to the video card connector 508, as illustrated in FIG. 7e. With the card coupling apparatus 604c coupled to the video card connector 508, the video card connectors 104a and 104b are electrically coupled to the microprocessor 506. In an embodiment, with the card coupling apparatus 604c coupled to the video card connector 508, a ×16 PCI-Express bus is included which is routed to the switch chip 108 that provides a pair of PCI-Express ports that are each connected to the video card connectors 104a and 104b which are each ×16 PCI-Express connectors, and each video card connector 104a and 104b has all 16 of its lanes connected to the video card connector 508, which is compliant with PCI-Express specifications.

Referring now to FIGS. 2a, 5, 7a, 7e, and 7f, the method 600 proceeds to step 608 where a plurality of the video cards 400 are coupled to the card coupling apparatus 604c. The first video card 400 is positioned in the information handling system 500 such that the connection member 404 matingly engages the card slot 104aa on video card connector 104a of card coupling apparatus 604c. With the connection member 404 engaging the video card connector 104a, the securing member 106aa on primary securing device 106a may be pivoted in order to secure the video card 400 in the video card connector 104a. The video card 400 is coupled to the video card connector 104a of card coupling apparatus 604c when the securing member 204 on secondary securing device 200 is engaged with the top surface 402c of the video card 400. The second video card 400 is then positioned in the information handling system 500 such that the connection member 404 matingly engages the card slot 104ba on video card connector 104b of card coupling apparatus 604c. With the connection member 404 engaging the video card connector 104b, the securing member 106ba on primary securing device 106b may be pivoted in order to secure the video card 400 in the video card connector 104b. The video card 400 is coupled to the video card connector 104b of card coupling apparatus 604c when the securing member 204 on secondary securing device 200 is engaged with the top surface 402c of the video card 400. Thus, a card coupling apparatus 604c is provided which allows a plurality of video cards 400 to be coupled to the information handling system 500 in a manner which is compliant with PCI-Express specifications. The use of the flex cable 300 in the system connector 604a preserves the signal integrity by reducing the number of impedance discontinuities compared to conventional approaches. Furthermore, the use of the flex cable 300 allows a relatively lower profile mounting of the plurality of video cards 400 in the information handling system 500 relative to other approaches.

Figure 8:
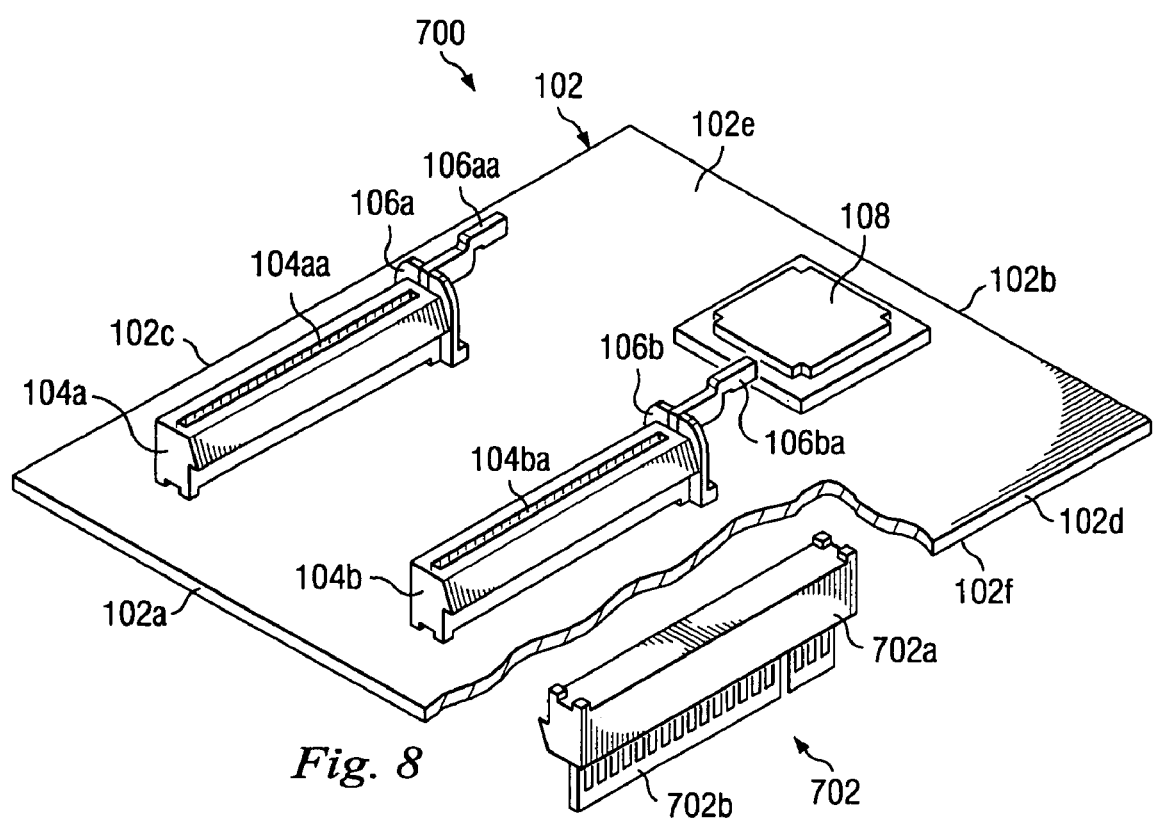
FIG. 8 is a fragmentary perspective view illustrating an embodiment of a card coupling apparatus.

Referring now to FIG. 8, in an embodiment, a card coupling apparatus 700 is substantially identical in design and operation to the card coupling apparatus 604c described above with respect to FIGS. 1, 2a, 2b, 3, 4, 5, 6, 7a, 7b, 7c, 7d, 7e, and 7f, with the provision of a modified system connector 702 replacing the system connector 604a. System connector 702 includes a video card connector 702a which is mounted to the bottom surface 102f of the circuit board 102 and having a connector member 702b extending from video card connector 702a which is operable to matingly engage the video card connector 508, illustrated in FIG. 6.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A card coupling apparatus comprising:
   a circuit board;
   a first plurality of connectors mounted on a first side of the circuit board;
   a second plurality of connectors mounted on a second side of the circuit board opposite the first side;
   a switch chip mounted to the circuit board and electrically coupled to the first and second plurality of connectors; and
   a card securing device mounted adjacent each of the first plurality of connectors, each card securing device including a card support at a first end and a card securing member at a second end, whereby a video card is receivable by each card securing device, each video card being supported by the card support and being secured by the card securing member for maintaining connection of the card in its respective one of the first plurality of connectors.

2. The apparatus of claim 1 wherein the second plurality of connectors receive first and second ends, respectively, of a flex cable having connector contacts between the first and second ends.

3. The apparatus of claim 1 wherein the second plurality of connectors include a PCI-Express connector.

4. The apparatus of claim 1 wherein the first plurality of connectors include PCI-Express connectors.

5. The apparatus of claim 1 wherein the switch chip includes a PCI-Express switch chip including a plurality of PCI-Express ports each coupled to one of the first plurality of connectors.

6. The apparatus of claim 1 wherein one of the first plurality of connectors is positioned directly opposite the second plurality of connectors.

7. An information handling system comprising:
a motherboard;
a microprocessor mounted on the motherboard;
a primary video card connector mounted on the motherboard and electrically coupled to the microprocessor; and
a video card coupling apparatus coupled to the primary video card connector, the video card coupling apparatus comprising:
a circuit board;
a first plurality of connectors mounted on a first side the circuit board;
a second plurality of connectors mounted on a second side of the circuit board opposite the first side and coupling the video card coupling apparatus to the primary video card connector; and
a switch chip mounted to the circuit board and electrically coupled to the first and second plurality connectors; and
a card securing device mounted adjacent each of the first plurality of connectors, each card securing device including a card support at a first end and a card securing member at a second end, whereby a video card is receivable by each card securing device, each video card being supported by the card support and being secured by the card securing member for maintaining connection of the card in its respective one of the first plurality of connectors.

8. The system of claim 7 wherein the second plurality of connectors receive first and second ends, respectively, of a flex cable having connector contacts between the first and second ends.

9. The system of claim 7 wherein the second plurality of connectors include a PCI-Express connector.

10. The system of claim 7 wherein the first plurality of connectors include PCI-Express connectors.

11. The system of claim 7 wherein the switch chip includes a PCI-Express switch chip including a plurality of PCI-Express ports each coupled to one of the first plurality of connectors.

12. The system of claim 7 wherein one of the first plurality of connectors is positioned directly opposite one of the second plurality of connectors.

13. A method for coupling a plurality of cards to an information handling system comprising:
providing a circuit board;
mounting a first plurality of connectors on a first side of the circuit board;
mounting a second plurality of connectors on a second side of the circuit board;
mounting a switch chip on the circuit board electrically coupled to the first and second plurality of connectors; and
mounting a card securing device adjacent each of the first plurality of connectors, each card securing device including a card support at a first end and a card securing member at a second end, whereby a video card is receivable by each card securing device, each video card being supported by the card support and being secured by the card securing member for maintaining connection of the card in its respective one of the first plurality of connectors.

* * * * *